(12) United States Patent
Stokes

(10) Patent No.: US 8,778,067 B1
(45) Date of Patent: Jul. 15, 2014

(54) EMISSION FILTRATION, MONITORING AND NOTIFICATION SYSTEM

(76) Inventor: Gary A. Stokes, Greenville, SC (US)

(*) Notice: Subject to any disclaimer, the term of this patent is extended or adjusted under 35 U.S.C. 154(b) by 76 days.

(21) Appl. No.: 13/426,976

(22) Filed: Mar. 22, 2012

(51) Int. Cl.
*B01D 46/46* (2006.01)

(52) U.S. Cl.
USPC ........... 96/417; 96/420; 96/421; 55/385.4; 55/515; 55/516; 55/518; 55/DIG. 34

(58) Field of Classification Search
USPC ........... 55/385.1, 385.3, DIG. 34; 96/15, 25, 96/111, 417, 421, 422, 424; 95/20, 25, 26, 95/280, 19, 23; 174/358; 439/86, 271
See application file for complete search history.

(56) References Cited

U.S. PATENT DOCUMENTS

| | | | |
|---|---|---|---|
| 3,675,398 A * | 7/1972 | Giarrizzo | 96/132 |
| 3,760,567 A | 9/1973 | Stalker | |
| 3,920,428 A | 11/1975 | Kinsley, Jr. | |
| 3,950,155 A * | 4/1976 | Komiyama | 96/111 |
| 4,315,579 A | 2/1982 | Martin, Jr. | |
| 5,316,569 A | 5/1994 | Heunermund | |
| 5,336,299 A * | 8/1994 | Savell | 95/70 |
| 5,711,785 A * | 1/1998 | Maxwell | 95/15 |
| 5,976,225 A * | 11/1999 | Nystrom et al. | 95/278 |
| 6,391,102 B1 * | 5/2002 | Bodden et al. | 96/417 |
| 7,244,283 B2 | 7/2007 | Mirza | |
| 7,261,762 B2 | 8/2007 | Kang et al. | |
| D574,944 S | 8/2008 | Arnold, Jr. | |
| 7,811,365 B2 * | 10/2010 | Grzonka et al. | 96/417 |
| 8,097,067 B2 * | 1/2012 | Fox et al. | 95/25 |
| 2010/0101986 A1 | 4/2010 | Pagano et al. | |
| 2010/0192772 A1 | 8/2010 | Poon | |

* cited by examiner

*Primary Examiner* — Duane Smith
*Assistant Examiner* — Minh-Chau Pham

(57) ABSTRACT

An adaptable emission filtration, monitoring, and notification system for emission sources within a civic infrastructure has a filter housing with filtration media located inside. The system has a control system with a filter intake sensor, a filter discharge sensor, a microprocessor, a power source, and a transmitter. The system has a civic reception system located in a geographically bound area of interest, with a receiver. The filter housing intake side is attached to an emission source discharge opening. The filtration media filters toxic emissions from the gas stream. The microprocessor compares the signal from the filter intake sensor and the filter discharge sensor then sends a resultant signal by way of a transmitter to the receiver of the civic reception system upon detected decreased efficiency of the filtration media.

9 Claims, 3 Drawing Sheets

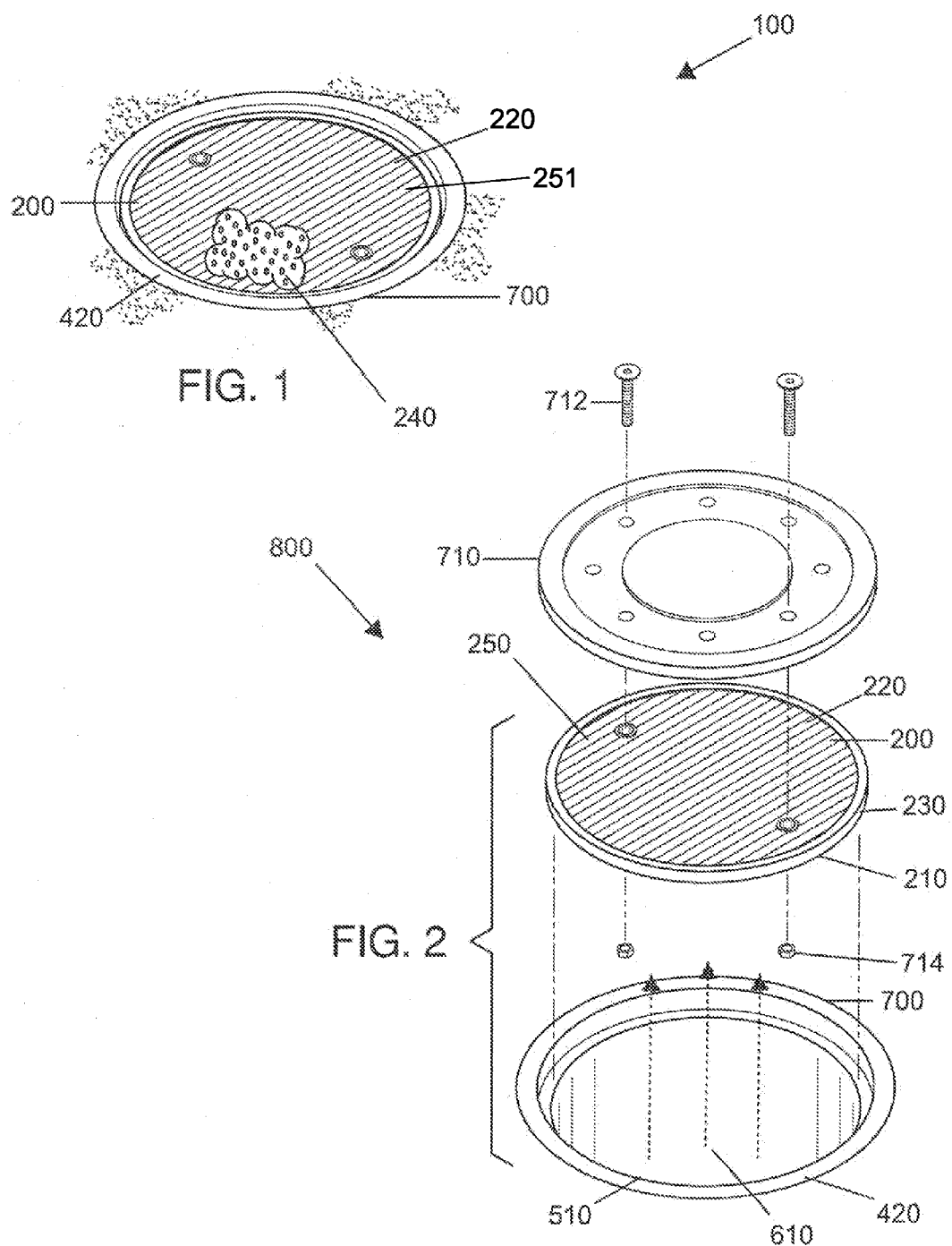

EMISSION FILTRATION, MONITORING AND NOTIFICATION SYSTEM

BACKGROUND OF THE INVENTION

Environmental pollution has been an issue for many years, possibly since man's earliest working of metals. The industrial revolution is credited with bringing about the bulk of the environmental pollution issues that are most familiar to people today with the burning of coal and fossil fuels acting as significant contributors. Many efforts have been made to curb pollution such as passing legislation and other initiatives on the part of governments, municipalities, industries, and individuals. The present invention teaches an adaptable emission filtration, monitoring, and notification system for members of a civic infrastructure.

SUMMARY

The present invention features an adaptable emission filtration, monitoring, and notification system for members of a civic infrastructure.

In some embodiments, the system comprises a filter housing with a high open area mesh located on a filter housing intake side and a high open area mesh located on a filter housing discharge side. In some embodiments, the system comprises filtration media located within the filter housing.

In some embodiments, the system comprises a control system having a filter intake sensor, a filter discharge sensor, a microprocessor, a power source, and a transmitter. In some embodiments, the system comprises a civic reception system located in a geographically bound area of interest, comprising a receiver.

In some embodiments, the filter housing intake side is affixed on an emission source discharge opening of a civic infrastructure member having a gas stream. In some embodiments, the gas stream passes through the filter housing by entering the filter housing intake side, passing through the filtration media, and exiting through the filter housing discharge side. In some embodiments, the filtration media filters toxic emissions from the gas stream.

In some embodiments, the microprocessor compares the signal from the filter intake sensor and the filter discharge sensor then sends a resultant signal by way of a transmitter to the receiver of the civic reception system upon detected decreased efficiency of the filtration media.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the present invention.

FIG. 2 is an exploded perspective view of the present invention.

DESCRIPTION OF PREFERRED EMBODIMENTS

Figure 3:
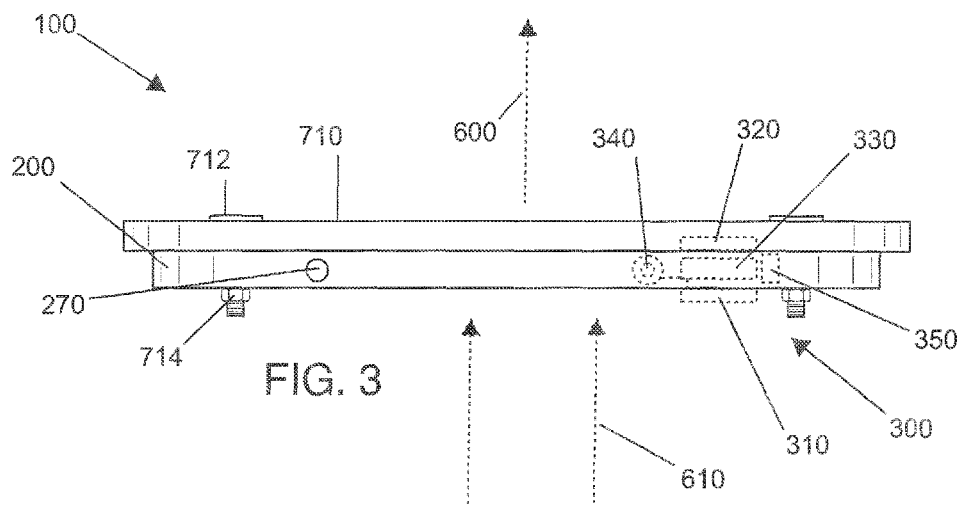
FIG. 3 is a side view of the present invention.
Figure 4:
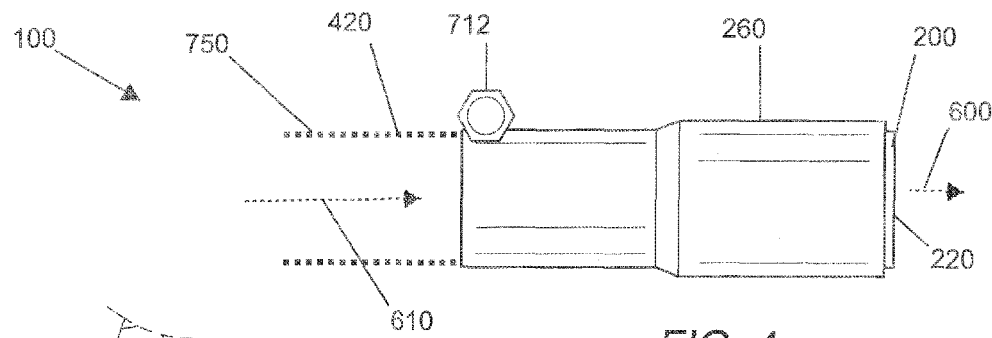
FIG. 4 is a side view of an alternate embodiment of the present invention.
Figure 5:
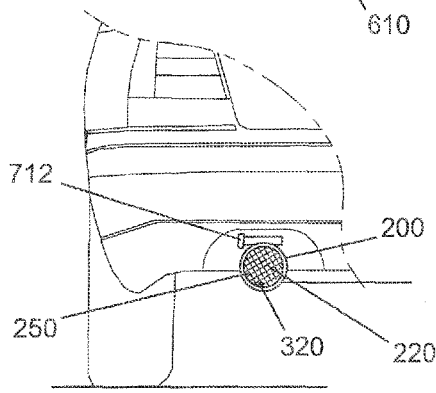
FIG. 5 is a rear view of an alternate embodiment of the present invention.
Figure 6:
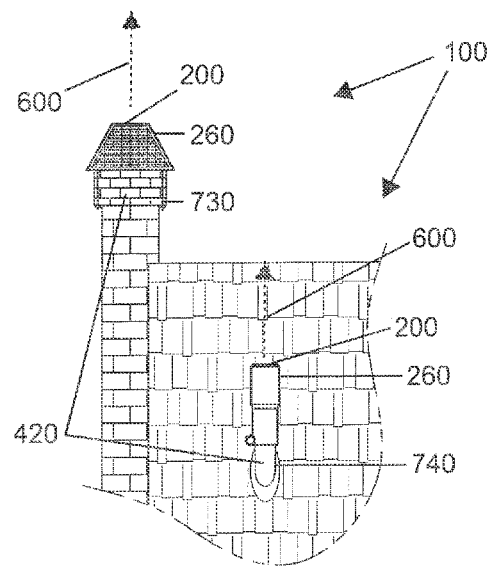
FIG. 6 is a side view of an alternate embodiment of the present invention.
Figure 7:
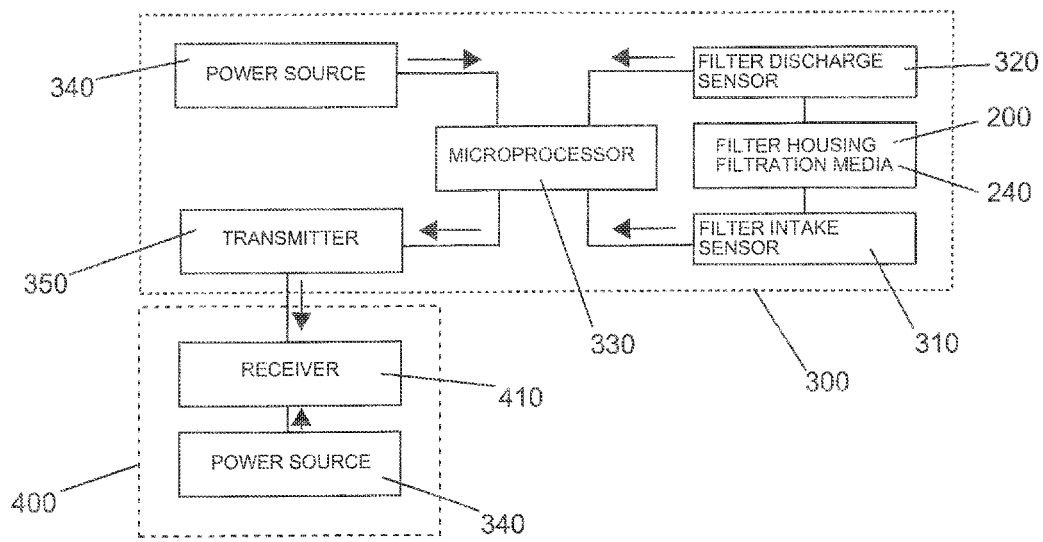
FIG. 7 is a block diagram of the present invention.

Following is a list of elements corresponding to a particular element referred to herein:

- 100 Emission filtration, monitoring, and notification system
- 200 Filter housing
- 210 Filter housing intake side
- 220 Filter housing discharge side
- 230 Filter housing side wall
- 240 Filtration media
- 250 High open area mesh
- 260 Adapter component
- 270 Filling port
- 300 Control system
- 310 Filter intake sensor
- 320 Filter discharge sensor
- 330 Microprocessor
- 340 Power source
- 350 Transmitter
- 400 Civic reception system
- 410 Receiver
- 420 Civic infrastructure member
- 510 Emission source discharge opening
- 600 Gas stream
- 610 Toxic emissions
- 700 Manhole
- 710 Manhole cover
- 712 Bolt
- 714 Nut
- 720 Cavity
- 730 Chimney flue
- 740 Sewer vent
- 750 Automobile exhaust pipe
- 800 Manhole emission filtration, monitoring, and notification system Referring now to FIG. 1-7, the present invention features an adaptable emission filtration, monitoring, and notification system (100) for a civic infrastructure member (420). In some embodiments, the civic infrastructure member (420) is a manhole. In some embodiments the civic infrastructure member (420) is a chimney flue. In some embodiments, the civic infrastructure member (420) is a sewer pipe vent. In some embodiments, the civic infrastructure member (420) is an automobile exhaust pipe.

In some embodiments, the system (100) comprises a filter housing (200) having a first high open area mesh (250) located on a filter housing intake side (210) and a second high open area mesh (251) located on a filter housing discharge side (220). In some embodiments, the system (100) comprises a filter housing side wall (230) and filtration media (240) located within the filter housing (200). In some embodiments, the system (100) comprises a control system (300) located in the filter housing (200), having a filter intake sensor (310), a filter discharge sensor (320), a microprocessor (330), a power source (340), and a transmitter (350). In some embodiments, the system (100) comprises a civic reception system (400) located in a geographically bound area of interest (a detection zone), comprising a receiver (410) and a power source (349)

In some embodiments, the transmitter (350) sends a signal to the receiver (410) via a radio wave. In some embodiments, the transmitter (350) sends a signal to the receiver (410) via satellite communication. In some embodiments, the transmitter (350) sends a signal to the receiver (410) via a wireless network (LAN, WAN, BLUETOOTH (R)). In some embodiments, the transmitter (350) sends a signal to the receiver (410) via a wired connection, for example, cable, wire, fiber optic cable, Ethernet cable, etc.)

In some embodiments, the filter housing intake side (210) is affixed on an emission source discharge opening (510) from a civic infrastructure member (420) having a gas stream (600). In some embodiments, the gas stream (600) passes through the filter housing (200) via entering the filter housing intake side (210), passing through the filtration media (240), and exiting through the filter housing discharge side (220). In some embodiments, the filtration media (240) filters toxic emissions (610) from the gas stream (600).

In some embodiments, the microprocessor (330) is operatively connected to the power source (340). In some embodiments, the microprocessor (330) is operatively connected to the filter intake sensor (310). In some embodiments, the filter intake sensor (310) sends a signal to the microprocessor (330). In some embodiments, the microprocessor (330) is operatively connected to the filter discharge sensor (320). In some embodiments, the filter discharge sensor (320) sends a signal to the microprocessor (330). In some embodiments, the microprocessor (330) compares the signal from the filter intake sensor (310) and the filter discharge sensor (320). In some embodiments, when the microprocessor (330) sends a resultant signal via a transmitter (350) to the receiver (410) of the civic reception system (400) upon detected decreased efficiency of the filtration media (240).

In some embodiments, upon receiving the resultant signal from the microprocessor (330), the civic reception system (400) will initiate a course of action based on the resultant signal.

In some embodiments, the filter housing intake side (210) comprises an adapter component (260). In some embodiments, the adapter component (260) comprises a clamp. In some embodiments, the adapter component (260) comprises a screw or a bolt. In some embodiments, the adapter component (260) affixed the filter housing (200) to the civic infrastructure member (420).

In some embodiments, the filter housing (200) comprises a filling port (270) to replace the filtration media (240) located within. In some embodiments, the filling port (270) is located on the filter housing intake side (210). In some embodiments, the filling port (270) is located on the filter housing discharge side (220). In some embodiments, the filling port (270) is located on the filter housing side wall (230).

In some embodiments, the filter intake sensor (310) is a pressure sensor. In some embodiments, the filter discharge sensor (320) is a pressure sensor. In some embodiments, the filter intake sensor (310) is a temperature sensor. In some embodiments, the filter discharge sensor (320) is a temperature sensor.

In some embodiments, the filter intake sensor (310) is a carbon monoxide sensor. In some embodiments, the filter discharge sensor (320) is a carbon monoxide sensor. In some embodiments, the filter intake sensor (310) is a carbon dioxide sensor. In some embodiments, the filter discharge sensor (320) is a carbon dioxide sensor.

In some embodiments, the filter intake sensor (310) is a hydrogen sulfide sensor. In some embodiments, the filter discharge sensor (320) is a hydrogen sulfide sensor. In some embodiments, the filter intake sensor (310) is a sulfur sensor. In some embodiments, the filter discharge sensor (320) is a sulfur sensor.

In some embodiments, the present invention features a manhole emission filtration, monitoring, and notification system (800). In some embodiments, the system (800) comprises a filter housing (200) having a high open area mesh (250) located on a filter housing intake side (210), high open area mesh (250) located on a filter housing discharge side (220), a filter housing side wall (230), and filtration media (240) located within.

In some embodiments, the system (800) comprises a control system (300) located in the filter housing (200) that has a filter intake sensor (310), a filter discharge sensor (320), a microprocessor (330), a power source (340), and a transmitter (350). In some embodiments, the system (800) comprises a civic reception system (400) located in a geographically bound area of interest, comprising a receiver (410) and a power source (340).

In some embodiments, the system (800) comprises a manhole (700) located on a surface. In some embodiments, the manhole (700) is an aperture located vertically above and fluidly connected to a cavity (720). In some embodiments, the cavity (720) is below grade. In some embodiments, the cavity (720) comprises toxic emissions (610). In some embodiments, the system (800) comprises a manhole cover (710) having a central aperture and an open area. In some embodiments, the filter housing (200) is located on the manhole (700). In some embodiments, the filter housing (200) fully covers the manhole (700). In some embodiments, the manhole cover (710) is affixed to the filter housing (200) via a bolt (712) and nut (714). In some embodiments, the manhole cover (710) is located above the filter housing (200) and the manhole (700) with respect to a ground surface. In some embodiments, the filter housing intake side (210) faces the manhole (700).

In some embodiments, a gas stream (600) passes through the filter housing (200) by entering the filter housing intake side (210), passing through the filtration media (240), and exiting through the filter housing discharge side (220). In some embodiments, the filtration media (240) filters toxic emissions (610) from the gas stream (600). In some embodiments, the microprocessor (330) is operatively connected to the power source (340). In some embodiments, the microprocessor (330) is operatively connected to the filter intake sensor (310). In some embodiments, the filter intake sensor (310) sends a signal to the microprocessor (330). In some embodiments, the microprocessor (330) is operatively connected to the filter discharge sensor (320). In some embodiments, the filter discharge sensor (320) sends a signal to the microprocessor (330). In some embodiments, the microprocessor (330) compares the signal from the filter intake sensor (310) and the filter discharge sensor (320). In some embodiments, the microprocessor (330) sends a resultant signal via a transmitter (350) to the receiver (410) of the civic reception system (400) upon detected decreased efficiency of the filtration media (240).

In some embodiments, toxic emissions (610) include carbon monoxide, carbon dioxide, hydrogen sulfide, or sulfur. In some embodiments, toxic emissions (610) include airborne particulates. In some embodiments, toxic emissions (610) include other gasses generated by the burning of fossil fuels. In some embodiments, toxic emissions (610) include other gasses generated by the burning of wood. In some embodiments, toxic emissions (610) include typical green house gasses. In some embodiments, toxic emissions (610) include typical sewer gasses.

In some embodiments, the filter housing (200) is less than about 2 inches in diameter. In some embodiments, the filter housing (200) is between about 2 inches in diameter and about 6 inches in diameter. In some embodiments, the filter housing (200) is between about 6 inches in diameter and about 12 inches in diameter. In some embodiments, the filter housing (200) is between about 12 inches in diameter and about 24 inches in diameter. In some embodiments the filter housing (200) is greater than about 24 inches in diameter.

As used herein, the term "about" refers to plus or minus 10% of the referenced number. For example, an embodiment wherein the filter housing is about 10 inches in length includes a filter housing that is between 9 and 11 inches in length.

The disclosures of the following U.S. Patents are incorporated in their entirety by reference herein: U.S. Pat. No. D 574,944; U.S. Pat. Publication No. 2010/0192772; U.S. Pat. Publication No. 2010/0101986; U.S. Pat. No. 7,261,762; U.S. Pat. No. 7,244,283; U.S. Pat. No. 5,316,569; U.S. Pat. No. 4,315,579; U.S. Pat. No. 3,920,428; U.S. Pat. No. 3,760,567.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An adaptable emission filtration, monitoring, and notification system for civic infrastructure members, wherein said system comprises:
   (a) a filter housing having a first high open area first mesh disposed on a filter housing intake side, a second high open area mesh disposed on a filter housing discharge side, a filter housing side wall, and filtration media disposed within, wherein the filter housing comprises a filling port to replace the filtration media disposed within;
   (b) a control system disposed in the filter housing having a filter intake sensor, a filter discharge sensor, a microprocessor, a power source, and a transmitter; and
   (c) a civic reception system disposed at a location in a geographically bound area of interest, comprising a receiver and a power source;
wherein the filter housing intake side is affixed on an emission source discharge opening from a civic infrastructure member having a gas stream, wherein the gas stream passes through the filter housing via entering the filter housing intake side, passing through the filtration media, and exiting through the filter housing discharge side, wherein the filtration media filters toxic emissions from the gas stream, wherein the microprocessor is operatively connected to the power source, wherein the microprocessor is operatively connected to the filter intake sensor, wherein the filter intake sensor sends a signal to the microprocessor, wherein the microprocessor is operatively connected to the filter discharge sensor, wherein the filter discharge sensor sends a signal to the microprocessor, wherein the microprocessor compares the signal from the filter intake sensor and the filter discharge sensor, wherein when the microprocessor sends a resultant signal via a transmitter to the receiver of the civic reception system upon detected decreased efficiency of the filtration media.

2. The system of claim 1, wherein filter housing intake side comprises an adapter component for connecting the filter housing to a civic infrastructure member.

3. The system of claim 1, wherein the filter intake sensor is a pressure sensor, wherein the filter discharge sensor is a pressure sensor.

4. The system of claim 1, wherein the filter intake sensor is a temperature sensor, wherein the filter discharge sensor is a temperature sensor.

5. The system of claim 1, wherein the filter intake sensor is a carbon monoxide sensor, wherein the filter discharge sensor is a carbon monoxide sensor.

6. The system of claim 1, wherein the filter intake sensor is a carbon dioxide sensor, wherein the filter discharge sensor is a carbon dioxide sensor.

7. The system of claim 1, wherein the filter intake sensor is a hydrogen sulfide sensor, wherein the filter discharge sensor is a hydrogen sulfide sensor.

8. The system of claim 1, wherein the filter intake sensor is a sulfur sensor, wherein the filter discharge sensor is a sulfur sensor.

9. An adaptable emission filtration, monitoring, and notification system for civic infrastructure members, wherein said system consisting of:
   (a) a filter housing having a first high open area first mesh disposed on a filter housing intake side, a second high open area mesh disposed on a filter housing discharge side, a filter housing side wall, and filtration media disposed within, wherein the filter housing comprises a filling port to replace the filtration media disposed within;
   (b) a control system disposed in the filter housing, having a filter intake sensor, a filter discharge sensor, a microprocessor, a power source, and a transmitter; and
   (c) a civic reception system disposed at a location in a geographically bound area of interest, comprising a receiver and a power source;
wherein the filter housing intake side is affixed on an emission source discharge opening from a civic infrastructure member having a gas stream, wherein the gas stream passes through the filter housing via entering the filter housing intake side, passing through the filtration media, and exiting through the filter housing discharge side, wherein the filtration media filters toxic emissions from the gas stream, wherein the microprocessor is operatively connected to the power source, wherein the microprocessor is operatively connected to the filter intake sensor, wherein the filter intake sensor sends a signal to the microprocessor, wherein the microprocessor is operatively connected to the filter discharge sensor, wherein the filter discharge sensor sends a signal to the microprocessor, wherein the microprocessor compares the signal from the filter intake sensor and the filter discharge sensor, wherein when the microprocessor sends a resultant signal via a transmitter to the receiver of the civic reception system upon detected decreased efficiency of the filtration media.

* * * * *